Sept. 22, 1931.  F. A. ANTON  1,824,188
LATERAL ARM AWNING SUPPORT
Filed May 29, 1930   2 Sheets-Sheet 1
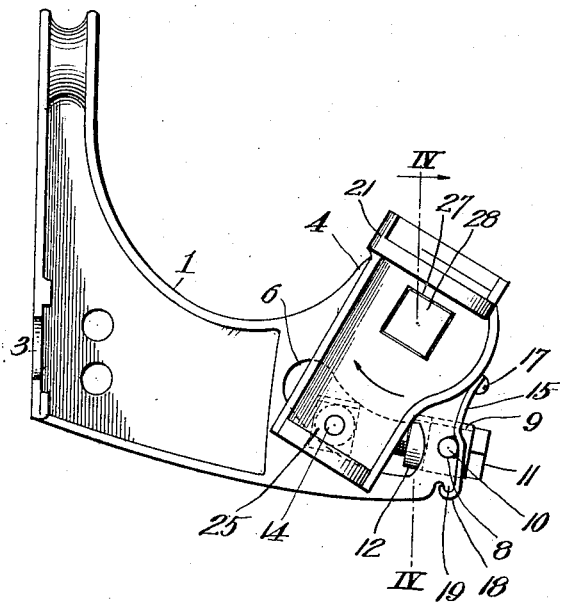
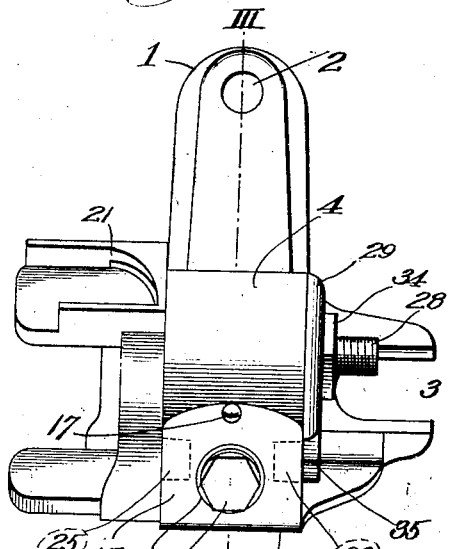
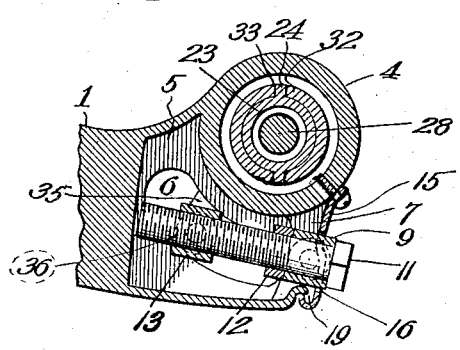
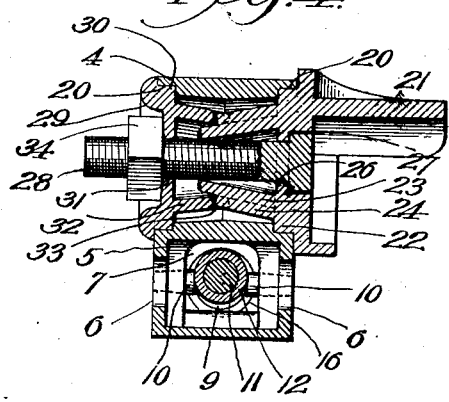
Inventor
Frederick A. Anton
By Thorpe & Thorpe
Attorneys

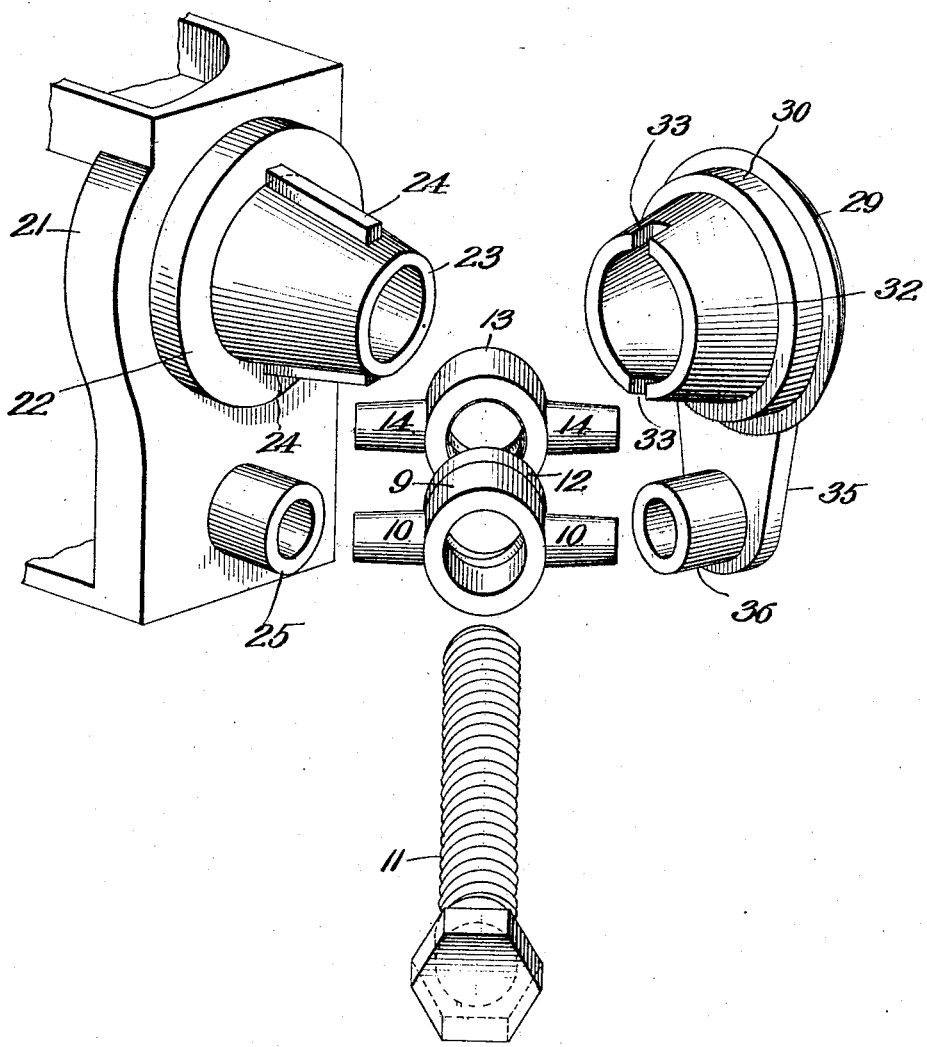

Patented Sept. 22, 1931

1,824,188

UNITED STATES PATENT OFFICE

FREDERICK A. ANTON, OF TOPEKA, KANSAS

LATERAL ARM AWNING SUPPORT

Application filed May 29, 1930. Serial No. 457,194.

This invention relates to lateral arm awning supports of that type adjustable to permit the awning when spread, to stand at any desired pitch or angle, and my object is to produce a support of the character mentioned composed of few parts and possessing efficiency, strength and durability in a high degree.

With this general object in view the invention consists in certain novel and useful features of construction and organization of parts as hereinafter described and claimed; and in order that it may be fully understood reference is to be had to the accompanying drawings, in which:

Figure 1 represents a side view of an awning support embodying the invention.

Figure 2 is a front view of the same.

Figure 3 is a vertical section taken on the line III—III of Figure 2.

Figure 4 is a vertical section taken on the line IV—IV of Figure 1.

Figure 5 is a detail perspective view of a clamp plate for retaining the adjusting screw in operative relation to and upon the hanger member of the support.

Figure 6 is a fragmentary perspective view of the hanger.

Figure 7 represents an enlargement in perspective of the chief movable parts of the support, in detached relation, but so arranged as to indicate clearly how the assembly thereof must occur to establish a cooperative relation between them.

Referring now to the drawings in detail, 1 indicates a generally L-shaped hanger provided with an opening 2 and a pair of slots 3, through which bolts or the like, not shown, secure the hanger to the front of a building or a transom bar thereof, not shown. The hanger is provided with a transversely extending cylindrical head 4 and with a hollow chamber 5 underlying said head, the side walls of the said chamber being provided with slots 6 extending substantially concentric with relation to the axis of the head 4. The front wall of the chamber directly underlies the head and is provided with an opening 7, and at opposite sides of the opening with transversely alined and substantially semi-circular journal openings 8.

A collar 9 is fitted in said opening 7 and is provided with a pair of laterally-projecting trunnions 10 engaging the journal openings 8. A headed adjusting bolt 11 extends through and bears a swivelled relation to collar 9. The head of the bolt bears against the front face of the collar 9 and the threaded stem of the bolt terminates adjacent the rear wall of the said chamber 5. A collar 12 or equivalent device, is rigidly secured in any suitable manner on the bolt and engages the inner face of collar 9 to prevent forward movement or shifting of the bolt. A second collar 13 engages the stem of said bolt with a threaded relation, and is provided with trunnions 14 projecting from opposite sides and into the respective slots 6 of the hanger.

To retain the bolt in operative position a clamp plate 15 fits snugly against the front face of the hanger and bridges and closes the journal openings 8 thereof over the trunnions 10 to retain the collar 9 in position without interfering with rotatable movement thereof on its said trunnions, the clamp plate having a central opening 16 large enough to fit over the collar 9 and the head of the bolt 11. The clamp plate is fastened in place by a clamping screw 17 extending through the wall of the cylindrical head of the hanger, and with an upturned hook 18 at its lower end engaging depending projections 19 formed on the hanger. It will thus be seen that the clamp plate is secured in place by only one movable part, viz., screw 17, but that there is no necessity for removing or disturbing said screw when it is desired to impart rotary movement to the bolt 11 for changing the pitch or angle of the awning, not shown, through adjustment of other parts hereinafter mentioned.

The cylindrical head is provided marginally with a pair of circular recesses 20. A bracket 21 for carrying the conventional or any suitable lateral arm of the folding type (not shown), fits against one side of the head of the bracket, and is provided with a circular boss 22 for fitting rotatably in the respective recess 20 of the head, and projecting from and of smaller diameter than said boss 22 is a conical extension 23 provided with diametrically opposite external ribs 24. The bracket 21 is also provided with a tubular boss 25 projecting into the respective slot 6 of the hanger, and forming a journal for the adjacent trunnion 14 of collar 13. The bracket axially of and through the boss and extension 23 is provided with a bore 26 and a communicating rectangular recess 27. A bolt 28 extends through said bore 26 and head 4, and its head fits non-rotatably in the recess 27.

A circular bracket 29 fits against the opposite side of the hanger head 4 from bracket 21, and is provided with a circular boss 30 fitting rotatably in the other recess 20 of the head. The bracket has a central opening 31 through which the bolt 28 extends, and concentrically of said opening said bracket has a conical extension 32 projecting into the head around and in contact with the small end of the extension 23, and said extension 32 has diametrically opposite notches 33 for receiving the adjacent ends of the ribs 24 for interlocking the two brackets 21 and 29 firmly together as regards rotatable movement. To inhibit separating movement of said brackets and to clamp them rigidly when desired, against opposite ends of the head 4, a nut 34 is engaged with the stem of the bolt 28 and bears against the exposed face of the bracket 29. The bracket 29 is provided with a depending arm 35 having a tubular boss 36 alined with boss 25, for engaging the other trunnion 14 of collar 13, said boss 36 also projecting into the respective slot 6 of the hanger head.

With the arrangement described, when nut 34 is not screwed home fully, the turning of bolt 11 in one direction will effect travel of the collar 13 thereon, and said collar through its trunnion engagement with brackets 21 and 29, will effect corresponding rotation thereof. If the movement of the collar 13 is rearward it will turn said brackets in the direction indicated by the arrow, Figure 1, and thus increase the pitch which the awning will assume when open or spread. If the bolt 11 is turned in the reverse direction, said brackets will be turned in the opposite direction from that indicated by the arrow, and thus dispose the awning, when open or spread, at a lesser angle or pitch. It will be understood of course that there will be two or more of the supports and mechanisms of the character described for each awning and that corresponding adjustments will be made with each support. When such adjustments have been made as to give the desired pitch or inclination to the awning when spread, the respective nuts 34 of the supports will be screwed home upon their respective bolts so as to clamp the brackets 21 and 29 in rigid relation to the hanger heads so that it shall not be possible for the bolts 11 of the supports to be accidentally turned and thus change the pitch or angle of the awning.

From the above description, it will be apparent that I have produced a lateral arm awning support embodying the feature of advantage set forth as desirable in the statement of the object of the invention, and which is susceptible of modification in minor particulars without departing from the spirit and scope of the appended claims.

I claim:

1. A lateral arm awning support comprising a hanger having a front opening, a pair of brackets rotatably adjustable on the hanger, a collar having outwardly projecting trunnions extending transversely of the hanger and pivotally engaging said brackets respectively, a second collar having outwardly-projecting trunnions extending transversely of and pivotally engaging the hanger, and a bolt extending through the front opening of the hanger and swivelled in the last-named collar and having a threaded engagement with the other collar.

2. A lateral arm awning support comprising a hanger having a front opening, a pair of brackets rotatably adjustable on the hanger, a collar having outwardly-projecting trunnions extending transversely of the hanger and pivotally engaging said brackets respectively, a second collar having outwardly-projecting trunnions extending transversely of and pivotally engaging the hanger, a bolt extending through the front opening of the hanger and swivelled in the last-named collar and having a threaded engagement with the other collar, and means for clamping the rotatable brackets rigidly to the hanger.

3. A lateral arm awning support comprising a hanger having a front opening, a pair of brackets rotatably adjustable on the hanger and interlocked together as regards turning movement, a collar having outwardly-projecting trunnions extending transversely of the hanger and pivotally engaging said brackets respectively, a second collar having outwardly-projecting trunnions extending transversely of and pivotally engaging the hanger, and a bolt extending through the front opening of the hanger and swivelled in the last-named collar and having a threaded engagement with the other collar.

4. A lateral arm awning support comprising a hanger having a transversely-extending tubular head and a chamber underlying the head and provided with a front wall opening and with two side wall slots, a pair of brackets rotatably adjustable on and at opposite sides of the hanger, a collar having outwardly-projecting trunnions extending transversely of the hanger and through said slots and pivotally engaging said brackets respectively, a second collar fitting in the front wall opening and having outwardly-projecting trunnions extending transversely of and pivotally engaging the hanger, and a bolt extending through the front opening of the hanger and said second collar and swivelled to the latter and having a threaded engagement with the other collar.

5. A lateral arm awning support comprising a hanger having a transversely-extending tubular head and a chamber underlying the head and provided with a front wall opening and with two side wall slots, a pair of brackets rotatably adjustable on and at opposite sides of the hanger, one of said brackets having an angular socket, a collar having outwardly-projecting trunnions extending transversely of the hanger and through said slots and pivotally engaging said brackets respectively, a second collar fitting in the front wall opening and having outwardly-projecting trunnions extending transversely of and pivotally engaging the hanger, a bolt extending through the front opening of the hanger and said second collar and swivelled to the latter and having a threaded engagement with the other collar, and a bolt extending axially through the tubular head of the hanger and provided with an angular head bearing against one of said brackets and snugly engaging the said angular socket thereof, and a nut engaging the other end of said bolt and engaging the other bracket for clamping the brackets firmly against opposite sides of the head of the hanger.

6. A lateral arm awning support comprising a hanger having a head and a chamber below the head and provided with a front opening and a pair of side wall openings, the exposed face of the front wall of the chamber having opposite journal notches in the plane of the front opening of the hanger, a pair of brackets rotatably adjustable upon and engaging opposite sides of said head, a collar having oppositely-projecting trunnions extending through the side wall slots of the chamber and pivotally engaging the said brackets respectively, a second collar fitting in said front opening and having oppositely-projecting trunnions engaging said journal notches, a bolt extending through said front opening and engaging the first-named collar with threaded relation and the other collar with a swivelled relation, the bolt having a head bearing against the front side of the collar having the swivelled relation, means engaging the bolt and the rear side of the last-named collar to prevent forward movement of said bolt, and a plate secured to the front end of the hanger and provided with an opening for accessibility to the head of said bolt; said plate bridging said notches and engaging the trunnions of said collar to retain the latter in position without preventing turning movement of the trunnions in said notches.

7. A lateral arm awning support comprising a hanger having a head and a chamber below the head and provided with a front opening and a pair of side wall openings, the exposed face of the front wall of the chamber having opposite journal notches in the plane of the front opening hanger, a pair of brackets rotatably adjustable upon and engaging opposite sides of said head, a collar having oppositely-projecting trunnions extending through the side wall slots of the chamber and pivotally engaging the said brackets respectively, a second collar fitting in said front opening and having oppositely-projecting trunnions engaging said journal notches, a bolt extending through said front opening and engaging the first-named collar with threaded relation and the other collar with a swivelled relation, the bolt having a head bearing rearwardly against the collar having a swivelled relation, means engaging the bolt and the rear side of the last-named collar to prevent forward movement of said bolt, a plate fitting against the front end of the hanger and hooked at its lower end thereto and bridging the said journal notches to retain the trunnions in position in engagement with said notches; said plate having a central opening giving access to the head of the bolt engaging the collars, and means securing the plate firmly to the hanger in a plane above said trunnions bridged by the plate.

In testimony whereof I affix my signature.

FREDERICK A. ANTON.